United States Patent
Chen et al.

(10) Patent No.: US 6,735,216 B2
(45) Date of Patent: May 11, 2004

(54) SIMPLIFIED QUALITY INDICATOR BIT TEST PROCEDURES

(75) Inventors: Tao Chen, San Diego, CA (US); Vince Ryo Butsumyo, San Diego, CA (US); Levent Aydin, San Diego, CA (US)

(73) Assignee: Qualcomm, Inc.

( * ) Notice: Subject to any disclaimer, the term of this patent is extended or adjusted under 35 U.S.C. 154(b) by 261 days.

(21) Appl. No.: 09/822,947

(22) Filed: Mar. 30, 2001

(65) Prior Publication Data

US 2002/0064133 A1 May 30, 2002

Related U.S. Application Data

(60) Provisional application No. 60/239,775, filed on Oct. 11, 2000.

(51) Int. Cl.$^7$ ................................................. H04Q 7/00
(52) U.S. Cl. ........................... 370/441; 375/224; 455/69
(58) Field of Search .................................. 370/252, 335, 370/342, 343, 345, 350, 441, 468, 479; 375/224, 225, 227, 228; 455/69, 67.4, 67.1, 67.3, 522

(56) References Cited

U.S. PATENT DOCUMENTS

| | | | | |
|---|---|---|---|---|
| 5,103,459 A | * | 4/1992 | Gilhousen et al. | 370/206 |
| 5,396,516 A | | 3/1995 | Padovani et al. | |
| 5,416,797 A | * | 5/1995 | Gilhousen et al. | 370/209 |
| 5,629,934 A | * | 5/1997 | Ghosh et al. | 370/335 |
| 5,659,569 A | * | 8/1997 | Padovani et al. | 370/479 |
| 5,703,902 A | * | 12/1997 | Ziv et al. | 375/228 |
| 5,812,938 A | * | 9/1998 | Gilhousen et al. | 455/69 |
| 5,893,035 A | * | 4/1999 | Chen | 455/522 |
| 5,987,326 A | * | 11/1999 | Tiedemann et al. | 455/442 |
| 5,991,329 A | * | 11/1999 | Lomp et al. | 375/130 |
| 6,154,659 A | * | 11/2000 | Jalali et al. | 455/522 |
| 6,205,190 B1 | * | 3/2001 | Antonio et al. | 375/346 |
| 6,307,849 B1 | * | 10/2001 | Tiedemann, Jr. | 370/335 |
| 6,463,031 B1 | * | 10/2002 | Tran | 370/203 |

FOREIGN PATENT DOCUMENTS

| | | |
|---|---|---|
| WO | 97/18643 | 5/1997 |
| WO | 97/41653 | 11/1997 |

* cited by examiner

Primary Examiner—Wellington Chin
Assistant Examiner—William Schultz
(74) Attorney, Agent, or Firm—Philip R. Wadsworth; Kent D. Baker; S. Hossain Beladi

(57) ABSTRACT

In a code division multiple access communication system, a method and apparatus provide for an efficient testing of operating behavior of a quality indicator bit. The method and the accompanying apparatus include configuring a receiver to expect to receive a communication channel at a full data rate, and transmitting a signal from a transmitter to the receiver. The signal is carrying the communication channel at a data rate other than said full data rate, and at a power level for receiving at the full data rate. Consequently, the receiver fails to receive the communication channel at the full data rate. A received signal to noise ratio of the received signal at the receiver is determined. A value of the quality indicator bit is determined based on the determined signal to noise ratio. The determined value of the quality indicator bit is communicated to the transmitter.

11 Claims, 3 Drawing Sheets

SIMPLIFIED QUALITY INDICATOR BIT TEST PROCEDURES

RELATED APPLICATION(S)

The present application is a regular application of a provisional application filed on Oct. 11, 2000, in the United States Patent Office, having been granted a patent application Ser. No. 60/239,775.

BACKGROUND

1. Field

The disclosed embodiments relate to the field of communications.

2. Background

A system for wireless communications in accordance with the CDMA technique has been disclosed and described in various standards published by the Telecommunication Industry Association (TIA). One of ordinary skilled in the art is familiar with such standards. Such standards are commonly known as TIA/EIA/IS-2000, TIA/EIA/95A/B, and WCDMA, among several others. A copy of the standards may be obtained by accessing the world wide web at the address: http://www.cdg.org, or by writing to TIA, Standards and Technology Department, 2500 Wilson Boulevard, Arlington, Va. 22201, United States of America. The specification generally identified as WCDMA specification may be obtained by contacting 3GPP Support Office, 650 Route des Lucioles-Sophia Antipolis, Valbonne-France. A section of one of such standards pertains to performance testing of devices operating within the requirements as specified in each standard. Various disclosed embodiments provide for a simplified and detailed quality indicator bit (QIB) test procedure in a section of such standards.

To this end as well as others, there is a need for an improved communication system.

SUMMARY

In a code division multiple access communication system, a method and apparatus provide for an efficient testing of operating behavior of a quality indicator bit. The method and the accompanying apparatus include configuring a receiver to expect to receive a communication channel at a full data rate, and transmitting a signal from a transmitter to the receiver. The signal is carrying the communication channel at a data rate other than the full data rate, and at a power level for receiving at the full data rate. Consequently, the receiver fails to receive the communication channel at the full data rate. A received signal-to-noise ratio of the received signal at the receiver is determined. A value of the quality indicator bit is determined based on the determined signal to noise ratio. The determined value of the quality indicator bit is communicated to the transmitter.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Generally stated, a novel and improved method and an accompanying apparatus provide for an efficient performance testing process in a transmitter and a receiver in a code division multiple access communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
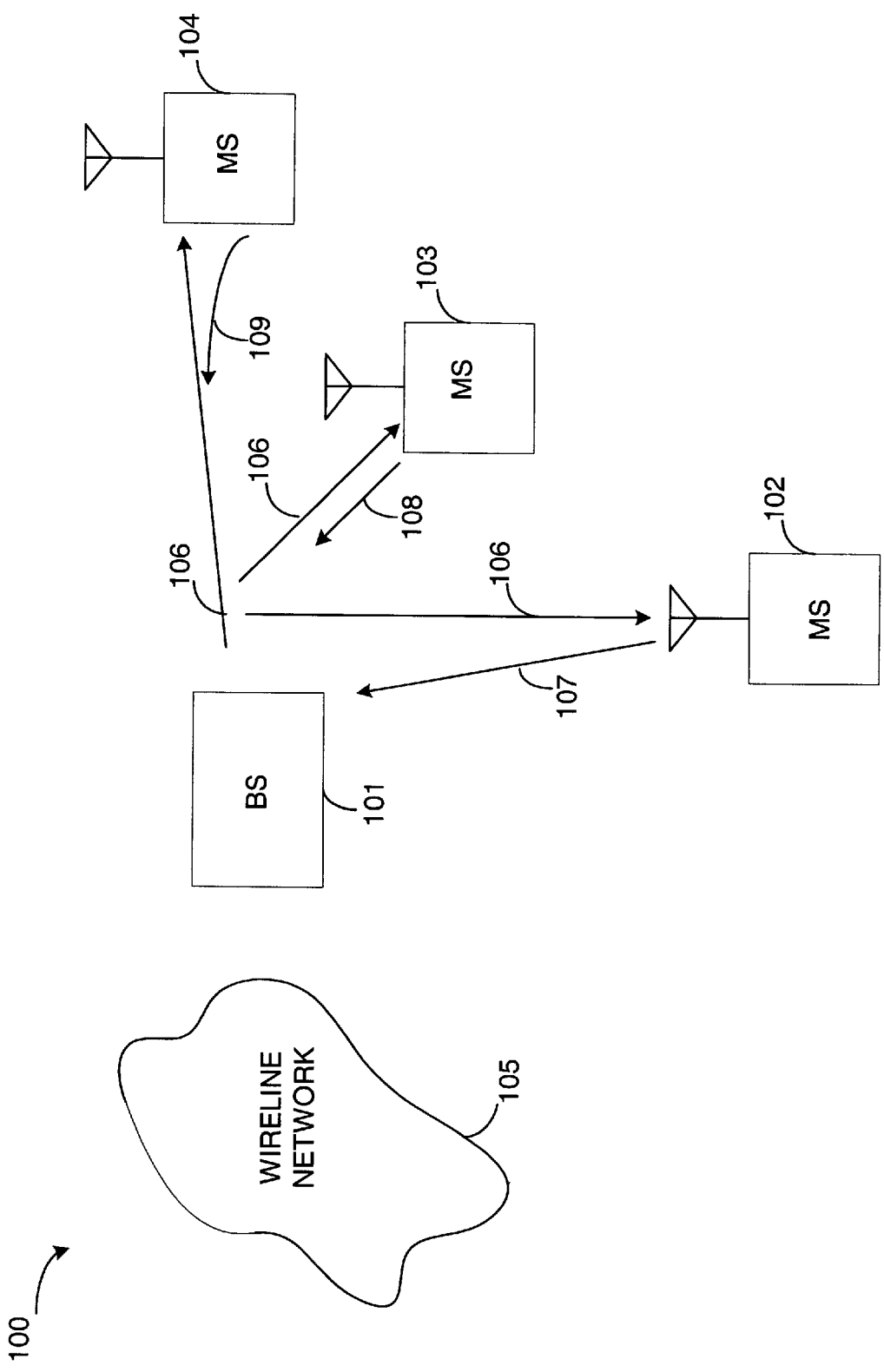
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards, and in accordance with various embodiments. Generally, communication system 100 includes a base station (BS) 101 that provides communication links between a number of mobile stations, such as mobile stations 102–104, and between the mobile stations 102–104 and a wireline network 105. BS 101 may include a number of components, such as a mobile station controller, a base station controller, and a radio frequency transceiver. For simplicity, such components are not shown. BS 101 may also be in communication with other base stations (not shown.) BS 101 communicates with each mobile station 102–104 via a forward link. The forward link may be maintained by a forward link signal transmitted from BS 101. The forward link signals targeted for several mobile stations 102–104 may be summed to form a forward link signal 106. Each of the mobile stations 102–104 receiving forward link signal 106 decodes the forward link signal 106 to extract the information that is targeted for its user. At the receiving end, the receiver may treat as interference the portion of the received forward link signal 106 targeted for others.

Mobile stations 102–104 communicate with BS 101 via a corresponding reverse link. Each reverse link is maintained by a reverse link signal, such as reverse link signals 107–109 for respectively mobile stations 102–104. BS 101 may also transmit a predefined series of data bits on a pilot channel via the forward link to all mobile stations to assist each mobile station in decoding the forward link signal 106. Each of the mobile stations 102–104 may transmit a pilot channel to BS 101. The pilot channel transmitted from a mobile station may be used for decoding the information carried by the reverse link signal transmitted from the same mobile station. The use and operation of a pilot channel are well known. A transmitter and a receiver for communicating via the forward and reverse links are included in each mobile stations 102–104, and BS 101.

Figure 2:
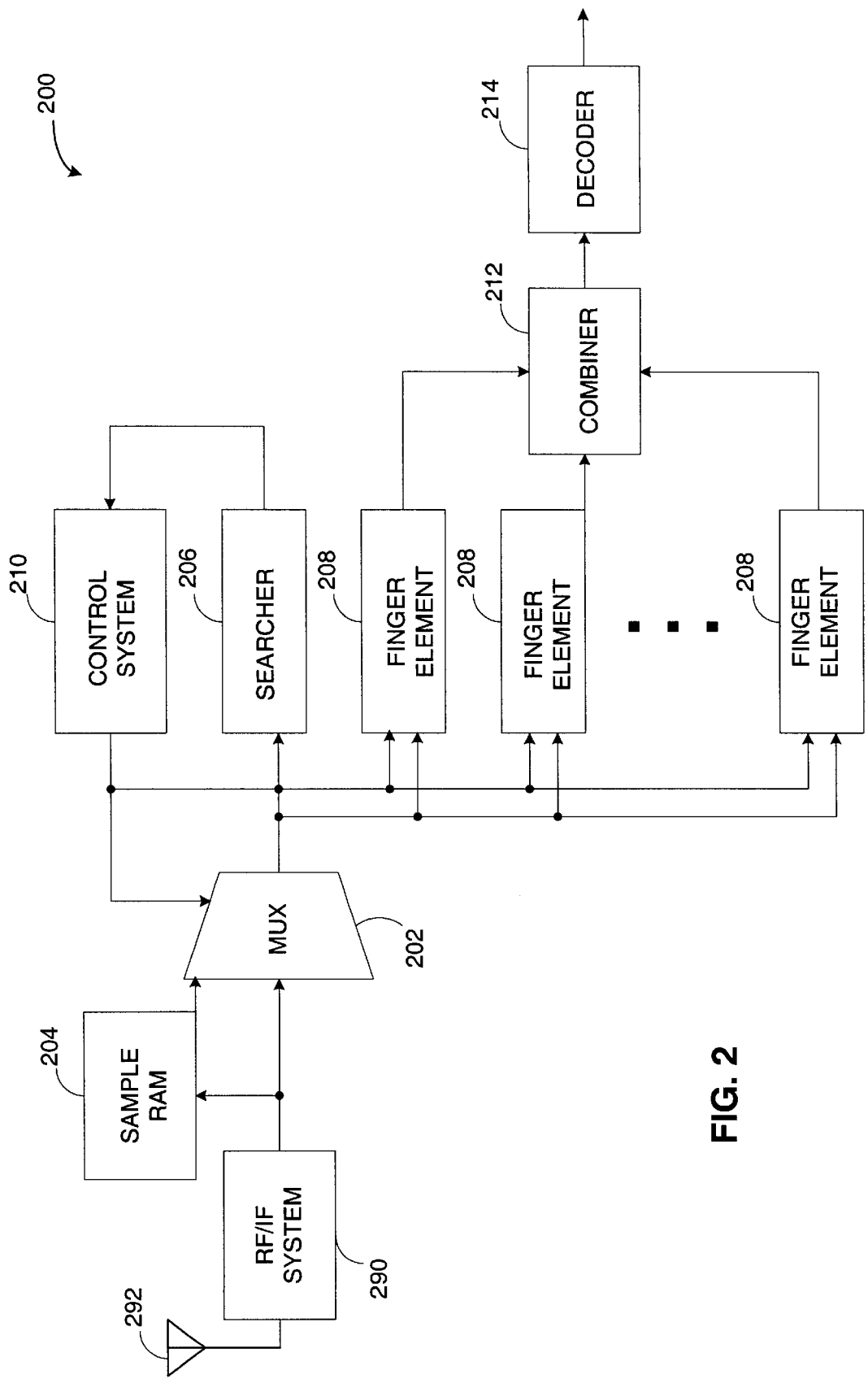
FIG. 2 illustrates a communication system receiver, for operation in a mobile station and a base station, capable of operating in accordance with various embodiments of the invention.

FIG. 2 illustrates a block diagram of a receiver 200 used for processing CDMA signals. Receiver 200 demodulates the received signal to extract the information carried by the received signal. Receive (Rx) samples are stored in RAM 204. Receive samples are generated by a radio frequency/intermediate frequency (RF/IF) system 290 and an antenna system 292. Antenna system 292 receives an RF signal, and passes the RF signal to RF/IF system 290. RF/IF system 290 may be any conventional RF/IF receiver. The received RF signals are filtered, down-converted, and digitized to form RX samples at baseband frequencies. The samples are supplied to a demultiplexer (demux) 202. The output of demux 202 is supplied to a searcher unit 206, and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit.

During operation, receive samples are supplied to demux 202. Demux 202 supplies the samples to searcher unit 206, and finger elements 208. Control unit 210 configures finger elements 208 to perform demodulation of the received signal at different time offsets based on search results from searcher unit 206. The results of the demodulation are combined and passed to decoder 214. Decoder 214 decodes the data, and outputs the decoded data.

In general for searching, searcher 206 may use non-coherent demodulation of a pilot channel to test timing hypotheses and phase offsets corresponding to various transmitting sources and multi-paths. The demodulation performed by finger elements 208 may be performed via coherent demodulation of other channels such as control and traffic channels. The information extracted by searcher 206 by demodulating a pilot channel may be used in finger elements 208 for demodulation of other channels. The searcher 206 and finger elements 208 may provide both pilot channel searching, and demodulation of control and traffic channels. The demodulation and searching can be performed at various time offsets. The results of the demodulation may be combined in combiner 212 before decoding the data transmitted on each channel. Despreading of the channels is performed by multiplying the received samples with the complex conjugate of the PN sequence and assigned Walsh function at a single timing hypothesis, and digitally filtering the resulting samples, often with an integrate and dump accumulator circuit (not shown). Such a technique is commonly known in the art. Receiver 200 may be used in BS 101 and mobile stations 102–104 for decoding the information on respectively reverse and forward links signals. BS 101 may employ several of receiver 200 to decode the information transmitted from several mobile stations at the same time.

Receiver 200 may also perform interference cancellation through a correlation process. The received samples, after being read from RAM 204, are passed through a correlation process for each received signal. The correlation process may collectively be described as the operations of searcher 206, finger element 208, and combiner 212. Since the received samples contain samples from the signals transmitted from more than one transmitting source, the correlation process may be repeated for each received signal. The correlation process for each received signal may be unique because each signal may require different correlation parameters as of those found in operations of searcher 206, finger element 208, and combiner 212. Each signal may include a traffic channel and a pilot channel. The PN sequence assigned to the traffic channel and pilot channel carried by each signal may be different. The correlation process may include channel estimation, which includes estimating the channel fading characteristics based on the result of correlating with the pilot channel. The channel estimation information is used for correlating with the traffic channel. Each traffic channel is then decoded.

The result from each correlation process may pass through a decoding process in decoder 214. If the transmitted channel is encoded via a convolutional encoding process, decoding step 214 is performed according to the utilized convolutional code. If the transmitted channel is encoded via a turbo encoding process, decoding step 214 is performed according to the utilized turbo code.

Each signal may be decoded to provide enough information about whether a pass indicator is produced for each cyclic redundancy check (CRC) associated with each transmitted frame of data. Operation and use of CRC in a communication system are well known. If the CRC is passed, the decoded result of the channel associated with the passed CRC may be passed on for further receiving operation. A quality indicator bit (QIB) may also be used to indicate signal quality. The QIB may be communicated on a reverse link power control sub-channel to indicate signal quality on the forward link forward dedicated control channel (DCCH). When the forward fundamental channel is present, the QIB is set to indicate the same as an erasure indicator bit. An erasure indicator bit may indicate an erased channel frame and/or non-transmission of a channel frame.

The signals received by BS 101 may be input to receiver 200. Antenna system 292 and RF/IF system 290 receive the signals from the mobile stations to produce the samples of the received signals. The received samples may be stored in RAM 204. Receiver 200 may incorporate a number of searchers 206, a number of finger elements 208, a number of combiners 212, and a number of decoders 214 for simultaneously performing the correlation process and the decoding process for all the signals received from different mobile stations. However, only one antenna system 292 and RF/IF system 290 may be necessary.

Each time a correlation process is started, searcher 206 and finger element 208 may start anew for determining non-coherent demodulation of a pilot channel to test timing hypotheses and phase offsets. Searcher 206, or finger element 208, or searcher 206 and finger element 208 in combination, may determine the signal to interference ratio (S/I) for each received signal. The ratio Eb/I may be synonymous with the ratio S/I. The ratio Eb/I is a measure of signal energy over interference per unit of a data symbol or data bit. Therefore, S/I and Eb/I may be interchangeable in some respects. The interference (I) may typically be defined as the power spectral density of interference and thermal noise.

To control interference, the system controls the signal level transmitted from each transmitting source, or the data rate of the communication link, or both. Generally, each MS determines the needed reverse link power level to support both the traffic channel and the pilot channel. Various power control schemes for controlling power levels of signals transmitted from an MS in a communication system are known. The output power level of each MS is controlled by two independent control loops, an open loop and a closed loop. The open loop power control is based on the need of each MS to maintain an adequate communication link with the BS. Therefore, the MS closer to the BS needs less power than the MS further away. A strong receive signal at the MS indicates less propagation loss between the MS and the BS, and, thus, requires a weaker reverse link transmit power level. In the open loop power control, the MS sets the transmit power level of the reverse link based on independent measurements of S/I of at least one received channel, such as pilot, paging, sync, and traffic channels. The MS may make the independent measurement prior to power level setting on the reverse link.

Figure 3:
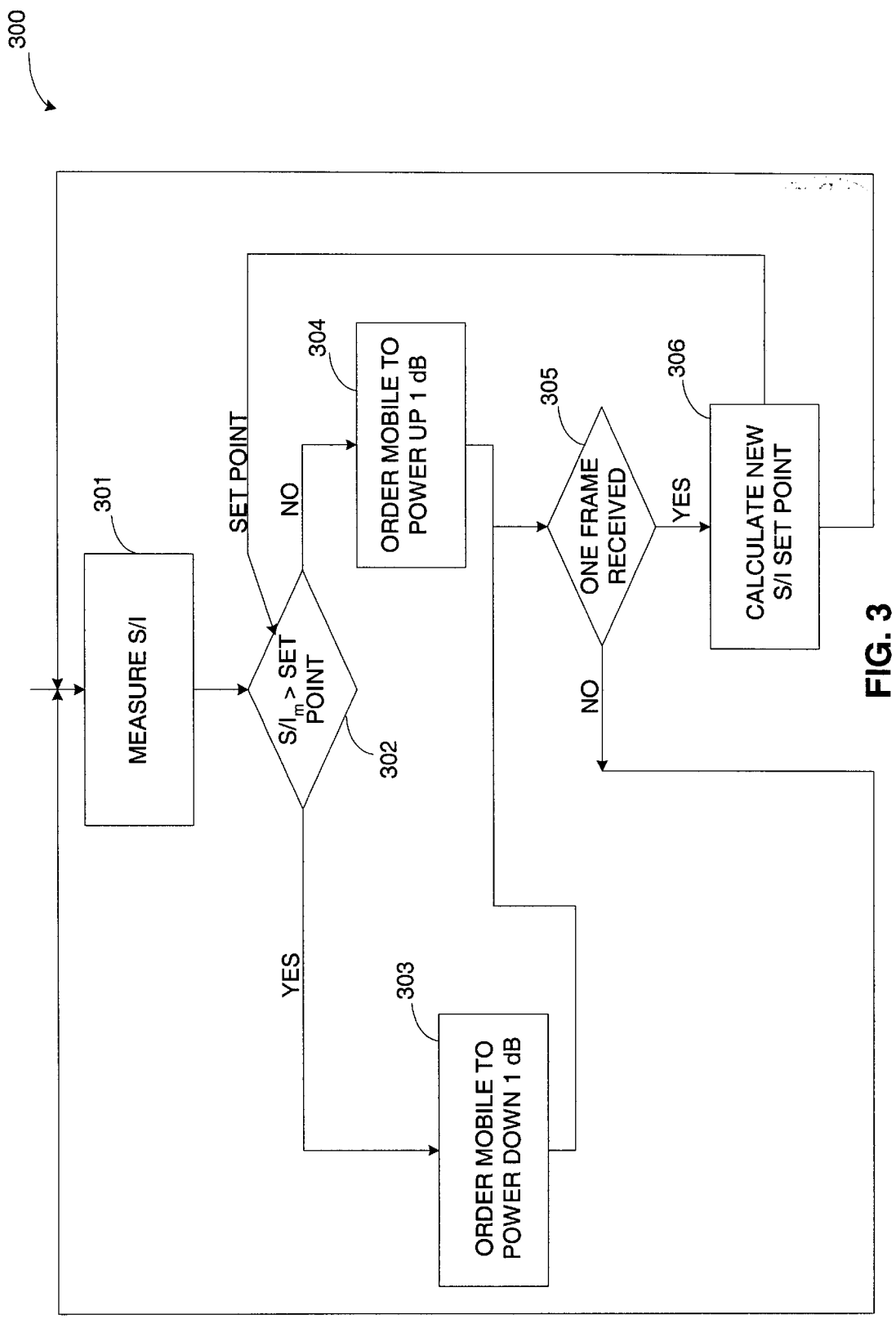
FIG. 3 illustrates a flow chart for controlling power level of a communication channel between a mobile station and a base station in accordance with various embodiments of the invention.

FIG. 3 illustrates a flow diagram 300 of an exemplary closed loop power control method. Operation of closed loop power control method 300 begins once an MS in communication system 100 seizes a forward link traffic channel. After the initial access attempt by the MS, the MS sets an initial reverse channel power level. The initial power level setting on the reverse link is then adjusted during the communication link via the closed loop power level control 300. The closed loop power control 300 operates with a faster response time than the open loop control. The closed loop power control 300 provides correction to the open loop power control. The closed loop power control 300 operates in conjunction with the open loop control during a traffic channel communication link to provide the reverse link power control with a large dynamic range.

To control the power level of the reverse link signal of a mobile station via the closed loop 300, BS 101 at step 301 measures the signal to interference ratio (S/I) of the reverse link signal transmitted from the mobile station. The measured S/I is compared with a set point S/I at step 302. The measured S/I may be in the form of Eb/I which is a ratio of bit energy over interference, and consequently, the set point may be in the same form. The set point is selected for the mobile station. The set point may be initially based on open loop power setting by the mobile station.

If the measured S/I is higher than the set point, at step 303, BS 101 orders the mobile station to power down the power level of its reverse link signal by an amount, for example 1 dB. When the measured S/I is higher than the set point, it indicates that the mobile station is transmitting on the reverse link at a signal power level higher than is needed to maintain an adequate reverse link communication. As a result, the mobile station is ordered to lower the signal power level of its reverse link to reduce the overall system interference. If the measured S/I is lower than the set point, at step 304, BS 101 orders the mobile station to power up the power level of its reverse link signal by an amount, for example 1 dB. When the measured S/I is lower than the set point, it indicates that the mobile station is transmitting on the reverse link at a signal power level lower than is needed to maintain an adequate reverse link communication. As a result of increasing the power level, the mobile station may be able to overcome the interference level and provide an adequate reverse link communication.

The operations performed at steps 302–304 may be referred to as the inner loop power control. The inner-loop power control keeps the reverse link (S/I) at the BS 101 as close as possible to its target threshold as provided by the set point. The target S/I is based on the set point selected for the mobile station. The power up or power down may be performed several times during a time frame. One time frame may be divided into 16 power control groups. Each power control group consists of several data symbols. The power up or power down command may be transmitted 16 times per frame. If one frame of data has not been received at step 305, the power control loop 300 continues to measure S/I of the reverse link signal during the next power control group at step 301. The process is repeated at steps 302–304 until at least one frame of data is received from the mobile station.

A single set point or target may not be satisfactory for all conditions. Therefore, the set point used at step 302 may also change depending on a desired reverse link frame error rate. If one frame of data has been received at step 305, a new S/I set point may be calculated at step 306. The new set point becomes the new S/I target for the mobile station. The new set point may be based on a number of factors including the frame error rate. For example, if the frame error rate is above a predetermined level, indicating unacceptable frame error rate, the set point may be raised to a higher level. By raising the set point to a higher level, the mobile station consequently increases its reverse link transmit power level via the comparison at step 302 and power up command at step 304. If the frame error rate is below a predetermined level indicating above an acceptable frame error rate, the set point may be lowered to a lower level. By lowering the set point to a lower level, the mobile station consequently decreases its reverse link transmit power level via the comparison at step 302 and power down command at step 303. The operations performed at steps 305–306, looping back from step 306 to step 302 to indicate a new set point, and looping back to step 301 for measuring the S/I of the new frames, may be viewed as the outer loop operation. The outer-loop power control may command once every frame, and the closed loop power control may command once every power control group. One frame and one power control group may be, respectively, 20 and 1.25 mSec long.

The system may also employ a forward link power control scheme to reduce interference. The MS communicates to the BS periodically about the voice and data quality. The frame error rate and quality measurements are reported to the BS via a power measurement report message. The message contains the number of frames received in error on the forward link during an interval. The power level of the forward link signal is adjusted based on the number of frame errors. Since such a quality measurement feedback is based on the frame error rate, such a mode of forward link power control is much slower than reverse link power control. For fast response, a reverse link erasure bit may be used to inform the BS whether the previous frame was received with or without error. The channel power gain may be continuously adjusted while monitoring the message or the erasure bit as a way of controlling forward link power level.

For communication of data, the forward link may be transmitted to the MS at a fixed power level while adjusting the effective forward link data rate targeted for the MS. The data rate adjustment on the forward link when viewed for the overall system is a form of interference control. Note that the forward link power control is generally for controlling interference in a coverage area, and/or for sharing a limited communication resources. When the feedback quality measurement is indicating poor reception, the data rate may be lowered while keeping the power level constant to overcome the effect of the interference. The data rate may also be lowered to allow other mobile stations to receive forward link communication at a higher data rate.

In addition to the open loop and closed loop power control schemes, the MS may adjust the output power level by attributes of a code channel as specified by the standard. The MS may set the output power of the enhanced access channel header, the enhanced access channel data, and the reverse common control channel data relative to the output power level of the reverse pilot channel. The output power level of the reverse pilot channel is set by the open and closed loop power controls. The MS maintains a power level ratio between the code channel power level and the reverse pilot channel power level. The ratio may be defined by the data rate used in the code channel. Generally, a table provides the values for the ratio at different data rates. The ratio generally increases for higher data rates. A ratio equal to one or a ratio less than one may also be possible. At a ratio equal to one, the power level of the pilot channel as set by the power control loop 300 is equal to the power level of the code channel. During transmission of data on a traffic channel, the data rate and the traffic channel power level may be adjusted. The power level may be selected based on a relative power of the reverse link pilot. Once an allowable data rate is selected, a corresponding channel gain with respect to the reverse link pilot power level is used to set the traffic channel power level.

In data mode, a BS may be providing communication links to a large number of MSs at different data rates. For example, one MS in a forward link connected state may be receiving data at a low data rate, and another MS receiving at a high data rate. On the reverse link, the BS may be receiving a number of reverse link signals from different MSs. An MS based on an independent measurement may decide and request a desired data rate from the BS. The desired forward link data rate may be communicated to the BS via a data rate control (DRC) channel. The BS attempts to provide a forward link data transfer at the requested data rate. On the reverse link, the MS may autonomously select a reverse link data rate from a number of possible reverse link data rates. The selected data rate may be communicated to the BS via a reverse rate indicator channel. Each MS may also be limited to a predetermined grade of service. A grade of service may limit the maximum available data rate on the forward and/or reverse links. Moreover, the communication of data may not be continuous in a way that, perhaps, voice data are communicated. A receiver may be receiving packets of data at different intervals. The interval for different receiver may be different. For example, a receiver may be receiving data sporadically while another receiver may be receiving data packets within short time intervals.

Communication of data at high data rates takes a greater transmit/receive signal power level than at low data rates. The forward and reverse links may have similar data rate activities in the case of voice communications. The forward and reverse links data rates may be limited to low data rates since the voice information frequency spectrum is limited. Possible voice data rates are commonly known and described in code division multiple access (CDMA) communication system standards such as IS-95, IS-2000 and WCDMA. For data communications, however, the forward and reverse links may not have similar data rates. For example, an MS may be retrieving a large data file from a database. In such a case, the communication on the forward link is predominantly occupied for transmission of data packets. The data rate on the forward link may reach 2.5 Mbps in a data mode. The data rate on the forward link may be based on a data rate request made by the MS. On the reverse link, the data rate may be lower, and may range from 4.8 to 153.6 Kbps.

Generally, in communication system 100, in accordance with various embodiments, duty cycle of a communication channel is determined, and power level of the communication channel is controlled based on the determined duty cycle. Each transmission of the communication channel may be in a time frame, For example, each time frame may be for a duration of 20 mSec. The data rate of each time frame may range from 1250 to 14400 bits per seconds. As such, the number of bits in each frame may be different depending on the data rate. The channel may be used for communication of user and signaling information during a call between the user and a destination. The user may be using a mobile station, such as mobile stations, 102–104 for the call. Any of the mobile stations 102–104 may be a cellular phone. The destination may be base station 101.

In accordance with an embodiment, the communication channel may be a dedicated control channel (DCCH). A DCCH channel may be used for communication of user and signaling information for maintaining a traffic data call between a user and a destination, such as, respectively, mobile stations 102–104 and base station 101. The number of DCCH frames transmitted over a period of time may be different depending on the usage. As such, the time between transmission of DCCH time frames during the traffic data call may be different. For example, even though traffic data may be communicated, a transmission of a frame on the communication channel, such as DCCH, may not necessarily take place. In yet another situation, several time frames of the communication channel, such as DCCH, may be transmitted in a short period of time. Therefore, the duty cycle of the transmission of the frames of the communication channel, such as DCCH, may be different at different times.

A test procedure for the quality indicator bit (QIB) may contain three parts that may be overlapping. Various disclosed embodiments provide a simplified procedure. Behavior of the QIB for the Forward Dedicated Control Channel may be performed on the Forward Dedicated Control Channel for mobile stations that support a channel configuration not containing the Forward Fundamental Channel. Forward Traffic Channel closed loop power control in the base station shall be enabled during this test. When operating with FPC_MODE equal to '100' and with a channel configuration that does not contain the Forward Fundamental Channel, the mobile station monitors the Forward Dedicated Control Channel and sends the QIB. When the frame is active, the Quality Indicator Bit has the same value as the EIB. When the frame is inactive, the QIB indicates the channel quality. In certain tests, the process verifies that the mobile station sends the QIB with the same value as the EIB for active frames. In certain tests, the process verifies that the mobile station sends the QIB according the received signal quality for inactive frames with power control bits only (i.e., without data).

The measurements may include:

Connecting the base station and an AWGN generator to the mobile station antenna connector.

For each band class that the mobile station supports, configuring the mobile station to operate in that band class and perform steps 3 through 8.

If the mobile station supports demodulation of Radio Configuration 3, 4, or 5, setting up a call using Dedicated Control Channel Test Mode 3, and perform steps 5 through 8.

If the mobile station supports demodulation of Radio Configuration 6, 7, 8, or 9, setting up a call using Dedicated Control Channel Test Mode 7 (see 1.3) and perform steps 5 through 8.

Setting the test parameters for Tests 1, 3, 5, 7, 9, 11, and 13 as specified in Tables A.2.13.1-1 through A.2.13.1-7 and sending alternating good and bad 20-ms frames with data. The good frames are sent from the base station simulator at the 9600 or 14400 bps rate. The bad frames are sent from the base station simulator in one of two ways: 1. At the 1500 or 1800 bps rates as in the Forward Fundamental Channel in the same radio configuration under test; or, 2. At the same 9600 or 14400 bps rate using a different radio configuration from the one under test.

Checking the received QIB at the base station against the corresponding frames received at the mobile station for at least 100 frames.

Setting the test parameters for Tests 2, 4, 6, 8, 10, 12, and 14 as specified in Tables A.2.13.1-1 through A.2.13.1-7 and alternately enable and disable the transmission of a frame with power control bits only on the Forward Dedicated Control Channel.

Checking the received QIB at the base station for at least 100 frames.

A minimum standard for certain tests may include that the QIB result follows the sent frame pattern of alternating '0' and '1' for 'good' and 'bad' frames respectively with 95% confidence. In certain tests, the minimum standard may include that the QIB result follows the sent frame pattern of alternating '0' and for 'enabling' and 'disabling' the transmission of frames respectively with 95% confidence.

TABLE A.2.13.1-1

Test Parameters for Behavior of QIB for Radio Configuration 3 Forward Dedicated Control Channel in AWGN

| Parameter | Units | Test 1 | Test 2 |
|---|---|---|---|
| $\hat{I}_{or}$ | dBm/1.23 MHz | -55 | |
| $\hat{I}_{or}/I_{oc}$ | dB | -1 | |
| $PilotE_c/I_{or}$ | dB | -7 | |
| $TrafficE_c/I_{or}$ | dB | [1 dB better than 1% FER in AWGN] | [1 dB better than 1% FER in AWGN] |
| $PowerControlE_c/I_{or}$ | dB | [1 dB better than PC Ec/Ior 1% FER in AWGN] | [1 dB better than PC Ec/Ior 1% FER in AWGN] |
| Data Rate | bps | 9600 during good frames | |
| Traffic $E_b/N_t$ | dB | [1 dB better than 1% FER in AWGN] | [1 dB better than 1% FER in AWGN] |

TABLE A.2.13.1-2

Test Parameters for Behavior of QIB for Radio Configuration 4 Forward Dedicated Control Channel in AWGN

| Parameter | Units | Test 3 | Test 4 |
|---|---|---|---|
| $\hat{I}or$ | dBm/1.23 MHz | -55 | |
| $\hat{I}_{or}/I_{oc}$ | dB | -1 | |
| $PilotE_c/I_{or}$ | dB | -7 | |
| $TrafficE_c/I_{or}$ | dB | [1 dB better than 1% FER in AWGN] | [1 dB better than 1% FER in AWGN] |
| $PowerControlE_c/I_{or}$ | dB | [1 dB better than PC Ec/Ior 1% FER in AWGN] | [1 dB better than PC Ec/Ior 1% FER in AWGN] |
| Data Rate | bps | 9600 | |
| Traffic $E_b/N_t$ | dB | [1 dB better than 1% FER in AWGN] | [1 dB better than 1% FER in AWGN] |

TABLE A.2.13.1-3

Test Parameters for Behavior of QIB for Radio Configuration 5 Forward Dedicated Control Channel in AWGN

| Parameter | Units | Test 5 | Test 6 |
|---|---|---|---|
| $\hat{I}_{or}$ | dBm/1.23 MHz | -55 | |
| $\hat{I}_{or}/I_{oc}$ | dB | -1 | |
| $PilotE_c/I_{or}$ | dB | -7 | |
| $TrafficE_c/I_{or}$ | dB | [1 dB better than 1% FER in AWGN] | [1 dB better than 1% FER in AWGN] |
| $PowerControlE_c/I_{or}$ | dB | [1 dB better than PC Ec/Ior 1% FER in AWGN] | [1 dB better than PC Ec/Ior 1% FER in AWGN] |
| Data Rate | bps | 14400 | |
| Traffic $E_b/N_t$ | dB | [1 dB better than 1% FER in AWGN] | [1 dB better than 1% FER in AWGN] |

TABLE A2.13.1-4

Test Parameters for Behavior of QIB for Radio Configuration 6 Forward Dedicated Control Channel in AWGN

| Parameter | Units | Test 7 | Test 8 |
|---|---|---|---|
| $\hat{I}_{or}$ | dBm/1.23 MHz | -55 | |
| $\hat{I}_{or}/I_{oc}$ | dB | -1 | |
| $PilotE_c/I_{or}$ | dB | -7 | |
| $TrafficE_c/I_{or}$ | dB | [1 dB better than 1% FER in AWGN] | [1 dB better than 1% FER in AWGN] |
| $PowerControlE_c/I_{or}$ | dB | [1 dB better than PC Ec/Ior 1% FER in AWGN] | [1 dB better than PC Ec/Ior 1% FER in AWGN] |
| Data Rate | bps | 9600 | |
| Traffic $E_b/N_t$ | dB | [1 dB better than 1% FER in AWGN] | [1 dB better than 1% FER in AWGN] |

TABLE A.2.13.1-5

Test Parameters for Behavior of QIB for Radio Configuration 7 Forward Dedicated Control Channel in AWGN

| Parameter | Units | Test 9 | Test 10 |
|---|---|---|---|
| $\hat{I}_{or}$ | dBm/1.23 MHz | -55 | |
| $\hat{I}_{or}/I_{oc}$ | dB | -1 | |
| $PilotE_c/I_{or}$ | dB | -7 | |
| $TrafficE_c/I_{or}$ | dB | [1 dB better than 1% FER in AWGN] | [1 dB better than 1% FER in AWGN] |
| $PowerControlE_c/I_{or}$ | dB | [1 dB better than PC Ec/Ior 1% FER in AWGN] | [1 dB better than PC Ec/Ior 1% FER in AWGN] |
| Data Rate | bps | 9600 | |
| Traffic $E_b/N_t$ | dB | [1 dB better than 1% FER in AWGN] | [1 dB better than 1% FER in AWGN] |

TABLE A.2.13.1–6

Test Parameters for Behavior of QIB for Radio
Configuration 8 Forward Dedicated Control Channel in AWGN

| Parameter | Units | Test 11 | Test 12 |
|---|---|---|---|
| $\hat{I}_{or}$ | dBm/1.23 MHz | −55 | |
| $\hat{I}_{or}/I_{oc}$ | dB | −1 | |
| $\dfrac{PilotE_c}{I_{or}}$ | dB | −7 | |
| $\dfrac{TrafficE_c}{I_{or}}$ | dB | [1 dB better than 1% FER in AWGN] | [1 dB better than 1% FER in AWGN] |
| $\dfrac{PowerControlE_c}{I_{or}}$ | dB | [1 dB better than PC Ec/Ior 1% FER in AWGN] | [1 dB better than PC Ec/Ior 1% FER in AWGN] |
| Data Rate | bps | 14400 | |
| Traffic $E_b/N_t$ | dB | [1 dB better than 1% FER in AWGN] | [1 dB better than 1% FER in AWGN] |

TABLE A.2.13.1–7

Test Parameters for Behavior of QIB for Radio
Configuration 9 Forward Dedicated Control Channel in AWGN

| Parameter | Units | Test 13 | Test 14 |
|---|---|---|---|
| $\hat{I}_{or}$ | dBm/1.23 MHz | −55 | |
| $\hat{I}_{or}/I_{oc}$ | dB | −1 | |
| $\dfrac{PilotE_c}{I_{or}}$ | dB | −7 | |
| $\dfrac{TrafficE_c}{I_{or}}$ | dB | [1 dB better than 1% FER in AWGN] | [1 dB better than 1% FER in AWGN] |
| $\dfrac{PowerControlE_c}{I_{or}}$ | dB | [1 dB better than PC Ec/Ior 1% FER in AWGN] | [1 dB better than PC Ec/Ior 1% FER in AWGN] |
| Data Rate | bps | 14400 | |
| Traffic $E_b/N_t$ | dB | [1 dB better than 1% FER in AWGN] | [1 dB better than 1% FER in AWGN] |

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a code division multiple access communication system, a method for determining operating behavior of a quality indicator bit comprising:
   a) configuring a receiver to expect to receive a communication channel at a full data rate;
   b) transmitting a signal from a transmitter to said receiver, wherein said signal is carrying said communication channel at a data rate other than said full data rate, and at a power level for receiving at said full data rate;
   c) failing to receive at said receiver said communication channel at said full data rate;
   d) determining received signal to noise ratio of said signal at said receiver;
   e) determining a value of said quality indicator bit based on said determined signal to noise ratio;
   f) communicating to said transmitter said determined value of said quality indicator bit.

2. The method as recited in claim 1 further comprising: repeating steps (b)–(f).

3. The method as recited in claim 1 further comprising:
   determining said operating behavior of said quality indicator bit based on said communicated value of said quality indicator bit.

4. The method as recited in claim 1 wherein said determining operating behavior of said quality indicator bit is for determining behavior of said quality indicator bit in a forward dedicated control channel in said communication system.

5. The method as recited in claim 1 wherein said communication channel is a forward dedicated channel.

6. The method as recited in claim 1 wherein said receiver is associated with a mobile station, and said transmitter associated with a base station in said communication system.

7. The method as recited in claim 1 wherein said full data rate is at one of 9600 and 14400 bit per second data rate, and said other than the full rate is at one of 1500 and 1800 bit per second data rate.

8. The method as recited in claim 1 wherein said power level for receiving at said full data rate is at a power level corresponding to a power level used at a power control sub-channel.

9. In a code division multiple access communication system, an apparatus for determining behavior of a quality indicator bit comprising:
   a receiver configured for expecting to receive at a full data rate;
   a first transmitter configured for transmitting a signal to said receiver at a data rate other than said full data rate, and at a power level for receiving at said full data rate;
   a controller at said receiver configured for detecting failure to receive at said receiver said signal at said full rate;
   wherein said receiver in communication with said controller further configured for determining received signal to noise ratio of said signal at said receiver, and determining a value of said quality indicator bit based on said determined signal to noise ratio;
   a second transmitter configured for communicating to said first transmitter said determined value of said quality indicator bit.

10. The apparatus as recited in claim 9 wherein said determining behavior of said quality indicator bit is for determining behavior of said quality indicator bit in a forward dedicated control channel in said communication system.

11. The apparatus as recited in claim 9 wherein said receiver is associated with a mobile station, and said first transmitter associated with a base station, and said second transmitter associated with said mobile station in said communication system.

* * * * *